Figure 1:
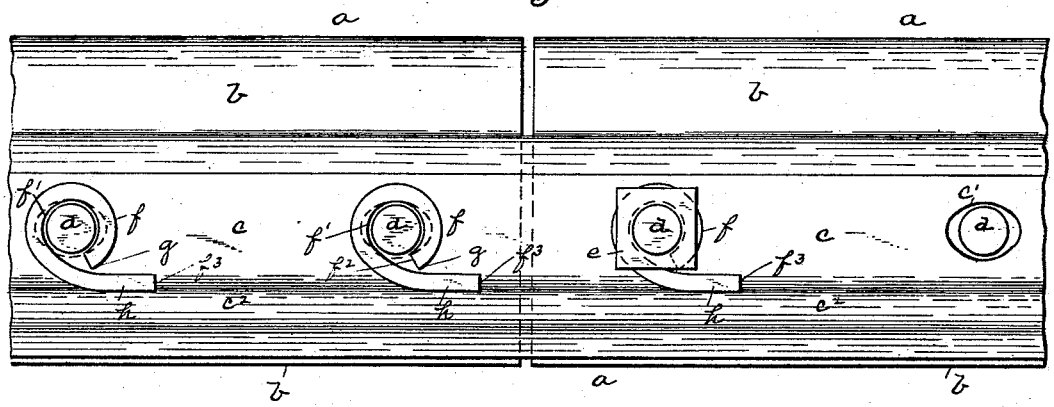

(No Model.)

W. M. DUANE & E. A. PECK.
NUT LOCK.

No. 524,778. Patented Aug. 21, 1894.

Witnesses:
J. G. Kay
N. Holliday.

Inventors.
William M. Duane
Ellsworth A. Peck.
By Kay, Totten & Cooke,
Attorneys.

UNITED STATES PATENT OFFICE.

WILLIAM M. DUANE AND ELLSWORTH A. PECK, OF INDIANAPOLIS, INDIANA.

NUT-LOCK.

SPECIFICATION forming part of Letters Patent No. 524,778, dated August 21, 1894.

Application filed September 1, 1892. Serial No. 444,747. (No model.)

*To all whom it may concern:*

Be it known that we, WILLIAM M. DUANE and ELLSWORTH A. PECK, residents of Indianapolis, in the county of Marion and State of Indiana, have invented a new and useful Improvement in Nut-Locks; and we do hereby declare the following to be a full, clear, and exact description thereof.

Our invention relates to nut locks, and has special reference to the class of circular nut locks or washers made from spring metal for use on rail joints, cars and other such objects.

The main difficulty with the class of nut locks above referred to, is, that when the nut would be applied to the bolt upon which the nut lock is placed, the nut lock or washer would rotate with the nut in screwing it up, and in a great many cases it caused the spring point of the nut lock to drop into the oblong bolt hole commonly used in the angle splices or bars, in which case the spring or essential part of these nut locks would be lost, and the nut lock simply serving as a plain washer around the bolt. A further difficulty with this class of nut locks is that when the nut lock is in close contact and pressing against the angle splice or bar from the great pressure of the nut in contact therewith, a groove would be worn in the angle splice or bar corresponding to the path or circumference of the nut lock, in which case the nut lock would be liable to be turned in the reverse direction from which it had been previously tightened up, so unlocking it and rendering it useless and loose upon the bolt.

The object of our invention is to overcome these difficulties and to provide a nut lock which will not rotate upon the bolt when the nut is screwed onto the bolt upon which the nut lock is placed, so preventing the formation of grooves in the angle spline or bar in the path of the nut lock, and the entering of the spring point of the nut lock into the oblong bolt hole in the angle splice or fish bar.

To these ends our invention consists, generally stated, in combining with a fish plate or like surface having an oblong bolt hole, a bolt and nut screwing thereon, and a nut lock formed of a spiral bar of spring metal having one edge adapted to engage the inner face of the nut, and having at the other end a short extension extending out tangentially beyond, and on the same plane with the body to increase the bearing of the nut lock upon the angle splice or fish bar and prevent its entrance into the bolt hole of the fish bar.

To enable others skilled in the art to make and use our invention, we will describe the same more fully, referring to the accompanying drawings, in which—

Figure 2:
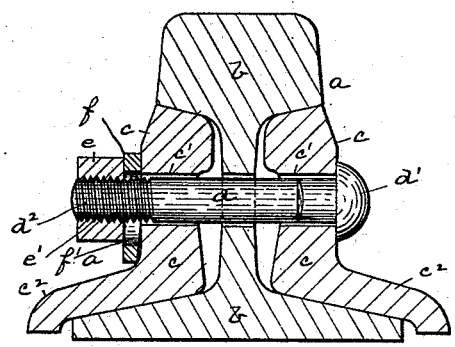
Figure 3:
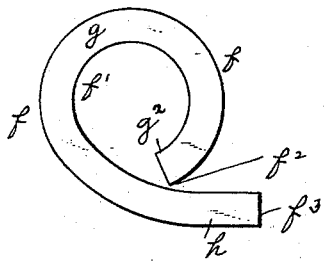
Figure 4:
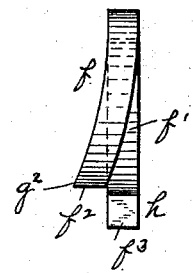

Figure 1 is a side view of a rail joint showing our invention applied thereto, the nuts not being applied to the bolts on the left side. Fig. 2 is a cross section of the same through the nut and nut lock, showing the bolt in full lines, and Figs. 3 and 4 are views of the nut lock.

Like letters indicate like parts in each of the figures of the drawings.

As is illustrated in the drawings, the invention is applied to a rail joint, although it may be used in connection with other devices and objects. The rail joint $a$ is composed of the rail sections $b\ b$ which are held together by the fish bars $c$ on each side of the rail sections $b\ b$, these fish bars $c$ have the oblong bolt holes $c'$ therein, through which pass the bolts $d$ having the heads $d'$ thereon at one end and the threaded portions $d^2$ at the other end. The nuts $e$ provided with the threaded openings $e'$ fit around the bolts $d$, these threaded openings $e'$ engaging with the threaded portions $d^2$ at one end of the bolts $d$. Interposed between the nuts $e$ and fish bars $c$ is the nut lock $f$, this nut lock $f$ having the opening $f'$ therein, said opening $f'$ being somewhat larger than the circumference of the bolt $d$, so that the nut lock $f$ can have free passage onto the bolts $d$. The nut lock $f$ is formed of one piece of spring metal and has the circular spring body portion $g$ with the spring point $g^2$ formed at one of its ends $f^2$, this spring point $g^2$ being bent slightly out of the circle line or plane of the circular spring body portion $g$ of the nut lock, in order that the spring point $g^2$ of the nut lock will press or bite into the nuts $e$ when the nut lock is applied to the bolts $d$. Extending out tangentially from the circular spring body portion $g$ and at the other end $f^3$ of the nut lock $f$ is the short extension $h$ resting or bearing on the flange $c^2$ of the fish bar $c$ and acting to prevent the rotation of the nut lock during the screwing home of the nut.

In the use of our improved nut lock, the nut lock $f$ is applied to the bolts with its circular spring body portion $g$ and spring point $g^2$ next to the nuts $e$, the short extension $h$ extending out tangentially to the right of the circular spring body portion $g$ of the nut lock $f$, and bearing upon the flange $c^2$ of the fish bar. When the nut is screwed upon the bolt, and in turning the nut to the right in screwing it home, the circular spring body portion $g$ will press against the nut and the spring point $g^2$ will bite into the nut, the short extension $h$ of the nut lock $f$ at the same time bears or presses against the flange $c^2$ of the fish bar. This short extension $h$ holds the circular spring body portion $g$ and the spring point $g^2$ of the nut lock $f$ in position against the nut when it is brought home or against the fish bar, and prevents the nut lock from rotating or turning while it is locked upon the bolt. This short extension $h$ extending out tangentially from the nut lock also allows the spring point $g^2$ to engage with the nut and prevents it from entering into the oblong bolt holes in the fish bars when it is locked. The short extension $h$ always remains bearing on the flange of the fish bar, enabling the operator to screw the nut onto the bolt without the nut lock turning around with the nut, it always remaining in the proper position to lock against the nut.

If it is desired to release the nut from engagement with the nut lock $f$ for any purpose, in which case by turning the nut in a left handed direction you will at the same time turn or rotate the nut lock in the same direction, the circular spring body portion $g$ will revolve about five-eighths ($\frac{5}{8}$) of a revolution. This allows the nut to free itself from the nut lock when the circular spring body portion $g$ and short extension $h$ will turn back, allowing the said short extension $h$ to fall or drop down and strike against the flange $c^2$ on the fish bar $c$, and then be ready to lock again upon the screwing up of the nut.

It will be seen that all liability of the nut lock rotating or turning when in its locked position is overcome, so preventing the spring point or biting end from entering the oblong bolt holes in fish bars, and rendering the lock useless. The short extension prevents the nut lock from turning and forming grooves in the fish bar, which are common in the use of circular nut locks, these grooves allowing the nut locks to turn in the reverse position and unlock. The short extension gives more surface of lock on the fish bar and causes a vast amount of friction which is essential in the use of nut locks. The nut lock is very simple, strong in its construction, and easily applied.

What we claim as our invention, and desire to secure by Letters Patent, is—

The combination with a fish bar or like body having an oblong bolt hole therein, of a bolt passing through the bolt hole and nut screwing on said bolt, and a nut lock on said bolt interposed between the nut and fish bar, said nut lock being formed of a spiral body having a spring point extending above the plane of such body and biting into the nut, and having the short tangential extension projecting out from and formed on the same plane as the body to increase the bearing of the nut lock upon the fish bar and prevent its entrance into the oblong bolt hole thereof, a separate nut lock being employed with each bolt, substantially as set forth.

In testimony whereof we, the said WILLIAM M. DUANE and ELLSWORTH A. PECK have hereunto set our hands.

WM. M. DUANE.
ELLSWORTH A. PECK.

Witnesses:
ALFRED A. BEAN,
H. L. S. BEAN.